US011418235B2

(12) United States Patent
Gommé et al.

(10) Patent No.: US 11,418,235 B2
(45) Date of Patent: Aug. 16, 2022

(54) VARIABLE RATIO NEAR FIELD WIRELESS DEVICE

(71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/093,858

(22) Filed: Nov. 10, 2020

(65) Prior Publication Data
US 2022/0149897 A1 May 12, 2022

(51) Int. Cl.
*H04B 5/00* (2006.01)

(52) U.S. Cl.
CPC ......... *H04B 5/0081* (2013.01); *H04B 5/0043* (2013.01); *H04B 5/0056* (2013.01)

(58) Field of Classification Search
CPC .. H04B 13/005; H04B 5/0031; H04B 5/0068; H04B 5/0081; H04B 10/00; H04B 5/0012; H04B 5/02; H04B 5/0025; G01R 33/02; G01V 3/088; H01Q 1/36; H01Q 1/22; H01Q 21/00; H01Q 23/00; H01Q 3/34
See application file for complete search history.

(56) References Cited

U.S. PATENT DOCUMENTS

| 8,028,588 | B2 | 10/2011 | Wenger | |
| 10,009,069 | B2 * | 6/2018 | Kerselaers | ........... H04B 13/005 |
| 10,014,578 | B2 * | 7/2018 | Kerselaers | ........... H04B 5/0012 |
| 10,015,604 | B2 * | 7/2018 | Kerselaers | ............. H04R 25/60 |
| 10,862,542 | B1 * | 12/2020 | Kerselaers | ........... H04B 5/0031 |
| 2003/0224751 | A1 * | 12/2003 | Vanderhelm | ........... H04B 1/126 |
| | | | | 455/296 |
| 2011/0094996 | A1 * | 4/2011 | Yamazawa | ........ H01L 21/67109 |
| | | | | 216/68 |
| 2012/0235508 | A1 * | 9/2012 | Ichikawa | ................ H02J 50/12 |
| | | | | 307/104 |
| 2014/0314456 | A1 * | 10/2014 | Kikuchi | ............. G03G 15/2053 |
| | | | | 399/329 |
| 2015/0318896 | A1 * | 11/2015 | Kerselaers | ........... H04B 5/0093 |
| | | | | 455/41.1 |
| 2017/0276625 | A1 | 9/2017 | Lueck | |

(Continued)

FOREIGN PATENT DOCUMENTS

CN 101466643 B 6/2009

OTHER PUBLICATIONS

U.S. Appl. No. 16/987,424; not yet published; 36 pages (filed Aug. 7, 2020).

(Continued)

*Primary Examiner* — Lewis G West

(57) ABSTRACT

One example discloses a near-field wireless device, including: a controller configured to be coupled to a near-field antenna; wherein the near-field antenna includes, a near-field electric antenna configured to transmit and/or receive near-field electric (E) signals; and a near-field magnetic antenna configured to transmit and/or receive near-field magnetic (H) signals; a conductivity monitor configured to determine a conductivity of a medium proximate to the near-field device; wherein the controller is configured to modulate an E/H ratio of fields generated by and/or received from the near-field electric (E) antenna and the near-field magnetic (H) antenna based on the conductivity of the medium.

20 Claims, 13 Drawing Sheets

(56) References Cited

U.S. PATENT DOCUMENTS

| | | | |
|---|---|---|---|
| 2017/0324170 A1* | 11/2017 | Kerselaers | H01Q 7/08 |
| 2018/0219273 A1* | 8/2018 | Kerselaers | H01Q 1/2283 |
| 2018/0241116 A1* | 8/2018 | Kerselaers | H04B 5/0031 |
| 2019/0296439 A1* | 9/2019 | Kerselaers | H01Q 1/273 |
| 2020/0083962 A1 | 3/2020 | Gomme et al. | |

OTHER PUBLICATIONS

U.S. Appl. No. 16/701,543; not yet published; 37 pages (filed Dec. 3, 2019).

* cited by examiner

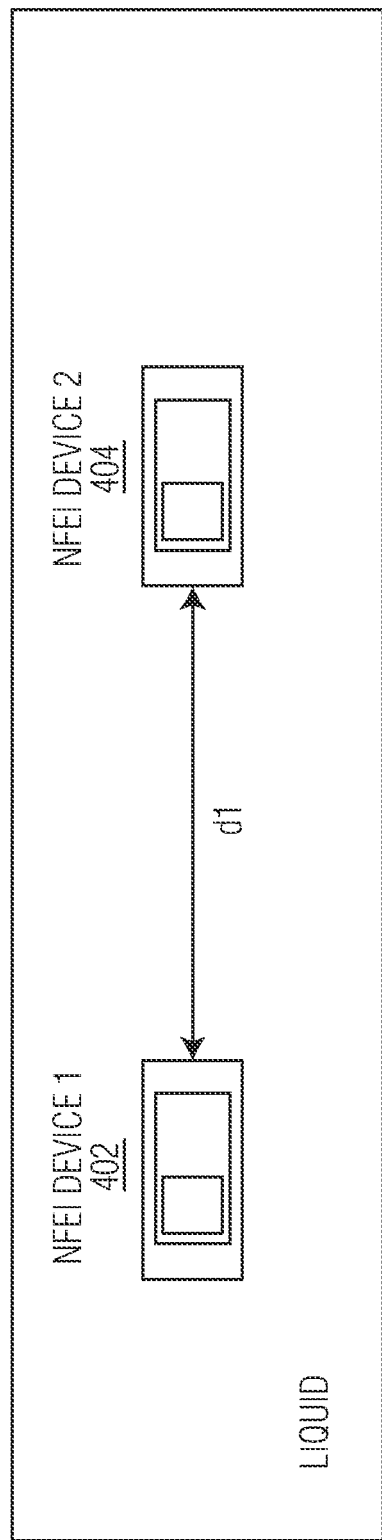

| ANTENNA ENVIRONMENT | C [pF] | Ctune [pF] |
|---|---|---|
| IN AIR | 1.86 | 66.5 |
| IN AIR ATTACHED TO A CONDUCTIVE STRUCTURE MIMICKING THE SKIN | 2.22 | 66.1 |
| IN PURE WATER | 7 | 61.1 |
| IN PURE WATER ATTACHED TO A CONDUCTIVE STRUCTURE MIMICKING THE SKIN | 7.64 | 60.8 |
| IN SEA WATER | 8.5 | 60 |
| IN SEA WATER ATTACHED TO A CONDUCTIVE STRUCTURE MIMICKING THE SKIN | 8.85 | 59.6 |

FIG. 7

VARIABLE RATIO NEAR FIELD WIRELESS DEVICE

The present specification relates to systems, methods, apparatuses, devices, articles of manufacture and instructions for near-field wireless communications.

SUMMARY

According to an example embodiment, a near-field wireless device, comprising: a controller configured to be coupled to a near-field antenna; wherein the near-field antenna includes, a near-field electric antenna configured to transmit and/or receive near-field electric (E) signals; and a near-field magnetic antenna configured to transmit and/or receive near-field magnetic (H) signals; a conductivity monitor configured to determine a conductivity of a medium proximate to the near-field device; wherein the controller is configured to modulate an E/H ratio of fields generated by and/or received from the near-field electric (E) antenna and the near-field magnetic (H) antenna based on the conductivity of the medium.

In another example embodiment, if the conductivity is beneath a threshold value, the controller is configured to maintain or increase the E/H ratio.

In another example embodiment, if the conductivity is above the threshold value, the controller is configured to reduce the E/H ratio.

In another example embodiment, the E/H ratio is calculated as: electric field (E-field) energy divided by magnetic field (H-field) energy.

In another example embodiment, the E/H ratio is calculated as: electric field (E-field) amplitude divided by magnetic field (H-field) amplitude.

In another example embodiment, the E/H ratio is calculated as: electric field (E-field) phase subtracted by magnetic field (H-field) phase.

In another example embodiment, further comprising a set of tuning values configured to set a resonance frequency and/or bandwidth of the near-field wireless device; wherein the conductivity monitor is configured to determine the conductivity of the medium based on the set of tuning values; and wherein the controller is configured to modulate the E/H ratio based on the set of tuning values.

In another example embodiment, the set of tuning values include a capacitance; and if the conductivity of the medium increases, the controller is configured to decrease the capacitance.

In another example embodiment, the set of tuning values include a capacitance; and if the conductivity of the medium decreases, the controller is configured to increase the capacitance.

In another example embodiment, the conductivity monitor is configured to determine the conductivity from a set of electrodes galvanically coupled to the medium.

In another example embodiment, the conductivity monitor is configured to determine the conductivity from a data communication received from a remote conductivity sensor.

In another example embodiment, the conductivity monitor is configured to determine the conductivity from a set of pre-programmed medium conductivities.

In another example embodiment, such pre-programmed medium conductivities are based on a medical and/or exercise protocol.

In another example embodiment, the conductivity monitor is configured determine the conductivity from an aggregate set of conductivity readings from a plurality of conductivity sensors.

In another example embodiment, the near-field device is a first near-field device configured to transmit and/or receive the near-field signals with a second near-field device and a third near-field device; an aggregate conductivity of an aggregate medium surrounding the first and second near-field devices is different from an aggregate conductivity of an aggregate medium surrounding the first and third near-field devices; the controller is configured to adjust the E/H ratio to a first E/H ratio when transmitting and/or receiving the near-field signals with the second near-field device; and the controller is configured to adjust the E/H ratio to a second E/H ratio when transmitting and/or receiving the near-field signals with the third near-field device.

In another example embodiment, the near-field device is configured to transmit and/or receive the near-field signals with a second near-field device; and the controller is configured to further adjust the E/H ratio in response to a distance of the near-field device from the second near-field device.

In another example embodiment, the medium is a liquid.

In another example embodiment, the medium is external to the near-field device.

In another example embodiment, the medium surrounds the near-field device.

In another example embodiment, the device is embedded in at least one of: a smart phone, a smart watch, a sensor, a medical sensor, an earbud, or an audio device.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 4B is an example top pictorial view of two near-field electric-induction (NFEI) devices with the presence of the human body.

FIG. 7 is table showing an example set of capacitances (C) for a near-field electric (E) antenna and corresponding tuning capacitance (C-bank) values dependent upon the medium in which the near-field devices are in.

Figure 1:
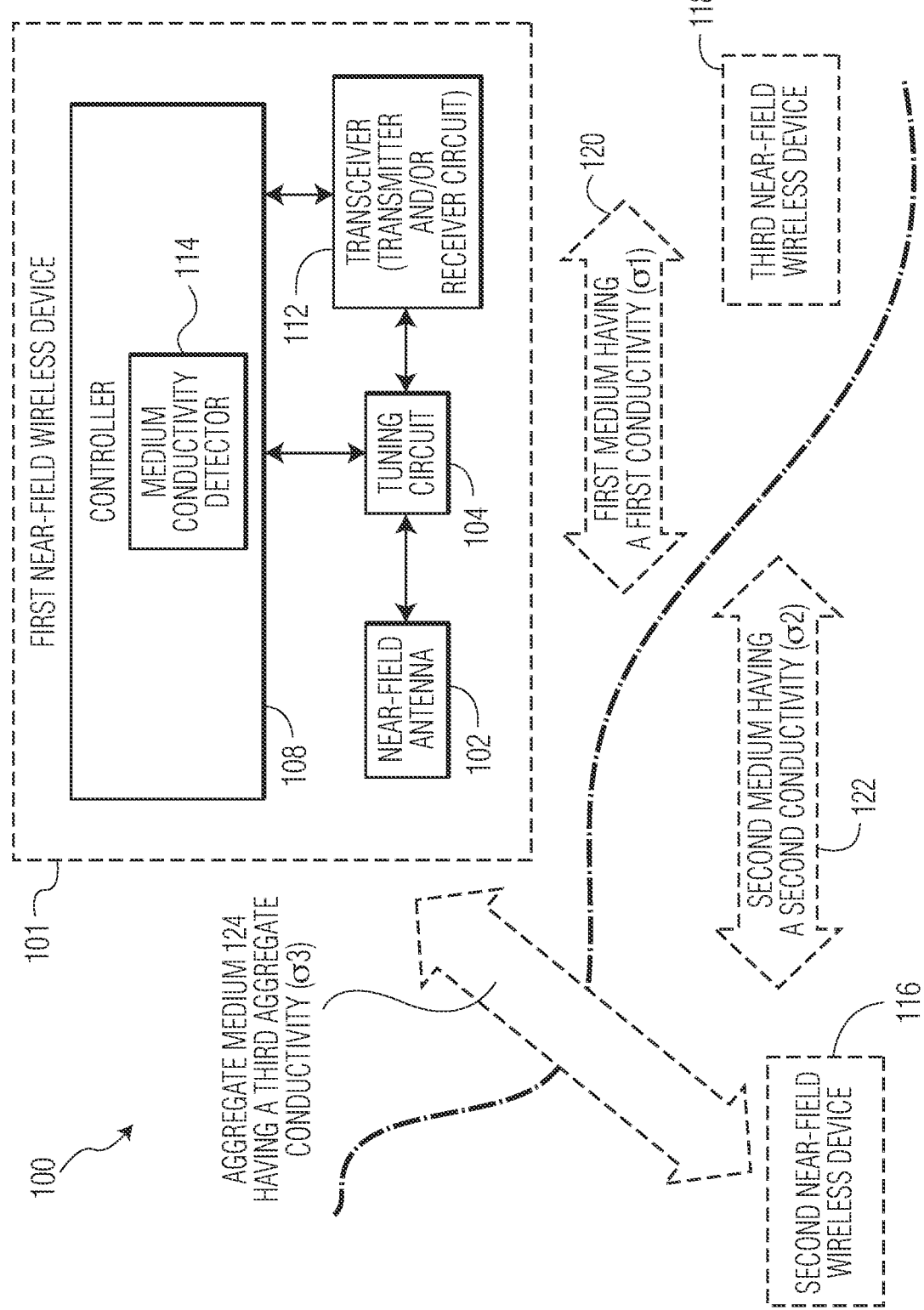
FIG. 1 is an example set of near-field wireless devices.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. either on-body or off-body devices) based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in the first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, in alternate embodiments, body is herein broadly defined to include at least: a human's body, an animal's body, a body of a living organism, a body structure of an inanimate object, a robot, a vehicle, a docking system, a physical coupling system, a station on an assembly line, and so on.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Although on and off body communications between users in some environmental mediums (e.g. air) can be reliable, robustness of near-field communication may be impaired by other environmental mediums (e.g. water) and dynamic variations as a user is moving through different mediums (e.g. moving from air to water and back in a therapy session, swimming, weather variations, sweating during exercise, etc.).

Now discussed are near-field based wireless devices for detecting a level of conductivity of one or more environmental mediums between multiple near-field devices, and modulating their near-field electromagnetic ratios (i.e. E/H ratios) based on this conductivity is discussed.

While near-field signals communicated on-body and in-air have electric fields that are substantially confined near a user's body due to a difference in conductivity between air and the user's skin tissue, near-field signals communicated within a fluid depend upon a conductivity of the fluid.

When a user wearing a near-field device is submersed in a low-conductivity medium (e.g. in a first mode) with respect to the user's skin (e.g. beneath a threshold conductivity), the electric field can exist significantly in the conducting medium and is still be confined near the user's body due to the continued difference in conductivity between the medium (e.g. fluid) and the user's skin tissue.

When a user wearing a near-field device is submersed in a high-conductivity medium (e.g. in a second mode) with respect to the user's skin (e.g. above the threshold conductivity), the electric field will not exist significantly in the highly conducting medium, but instead will be confined to within the near-field device's housing.

However given that an NFEMI device includes both the electric and magnetic field generating antennas, but changing the E/H ratio by passing more of the input signal to the magnetic antenna, the NFEMI device can still communicate with other near-field devices.

Note, while various example embodiments discussed herein refer to a "user", in alternate embodiments the user can be: a robot, a vehicle, a docking system, a physical coupling system, a station on an assembly line, and so on.

FIG. 1 is an example 100 set of near-field wireless devices. The example 100 shows a first near-field device 101 in a first medium 120 having a first conductivity (σ1), a second near-field device 116 in a second medium 122 having a second conductivity (σ2), and a third near-field device 118 in the first medium 120. Near-field communications between the first device 101 and the second device 116 will span two mediums 120 and 122 and so will thus be interpreted as an aggregate medium 124 having a third aggregate conductivity (σ3).

Now discussed in the first near-field device 101; however, the second and third devices 116, 118 have similar components in some example embodiments.

The first near-field device 101 includes a near-field antenna 102, a tuning circuit 104, a controller 108 having a medium conductivity detector 114, and a transceiver circuit 112.

The near-field antenna 102 in various example embodiments can be either an NFEMI, NFEI, NFC, or NFMI antenna. As such the antenna 102 may include a coil (H-field) antenna for magnetic fields, in conjunction with a short loaded dipole (E-field) antenna for electric fields. The H-field antenna may include a ferrite core wound with wire or may be a planar design. The E-field antenna may include one or two conductive loading structures/plates. The antenna 102 would include two or more feed-points designed to be coupled to various transceiver circuitry, such as the tuning circuit 104 and/or other downstream radio transmitter and receiver integrated circuits (RF-IC) (not shown).

The controller 108 is configured to monitor and maintain the device's 101 operational resonance frequency and operational bandwidth/quality factor of the near-field signals (e.g. NFEI or NFEMI) carried by the near-field antenna. The controller 108 is configured to adjust the tuning parameters if either the operational resonance frequency is different from a preselected resonance frequency and/or the operational bandwidth is different from a preselected bandwidth.

The tuning circuit 104 is configured to adjust the device's 101 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

The transceiver circuit 112 is configured to receive and transmit near-field communications signals to and from various other baseband circuitry (not shown).

The medium conductivity detector 114, within the controller 108, is configured to detect and monitor a conductivity of the medium 120 proximate to the device 101. In some example embodiments, the medium 120 is proximate to all or part of the device 101 and/or one of neighboring devices 116, 118. The medium 120 in some example embodiments is external to and/or surrounds the device 101 (e.g. when the device 101 is submerged in water).

The medium conductivity detector 114 in various example embodiments is: coupled to a conductivity sensor; coupled to receive tuning parameters from the tuning circuit 104; coupled to receiving a data communication from a remote conductivity sensor; and/or coupled to receive one or more pre-programmed set of medium conductivities based on an intended use of the device 101, such pre-programmed medium conductivities could be linked to perhaps a medical or exercise protocol.

The controller 108 is configured to command the tuning circuit 104 to modulate an E/H ratio of fields sent to and/or received from the near-field electric (E) antenna and the near-field magnetic (H) antenna in response to the detected conductivity of the medium 120.

As shown in FIG. 1, sometimes two mediums 120, 122 (e.g. a swimmer's arms going above and below the water line) separate two devices 101, 116 in communication. In such example embodiments the aggregate conductivity due to perhaps an average conductivity of the two mediums 120, 122 is determined by the conductivity detector 114. In other example embodiments another aggregate conductivity computation (i.e. not the average) can be used such that a robustness of near-field communication between the devices 101, 116 is achieved.

Thus the first device 101 will communicate with the second device 116 using a first E/H ratio, while the first device 101 will communicate with the third device 118 using a second E/H ratio. The E/H ratio used can dynamically vary as the devices 101, 116, 118 move within and in and out of the mediums 120, 122.

The E/H ratio can also be changed as pairs of the devices come closer to or further away from each other (e.g. a fine tuning of the E/H ratio by the controller 108 so as to maintain optimal near-field communications between the two devices. For example, two on-body devices can be impacted by too conductive water with respect to E-field when the user is in a certain static posture, but when this user then starts swimming the E-field distribution around his body will alter as body parts move, altering the channel loss as well.

Figure 2:
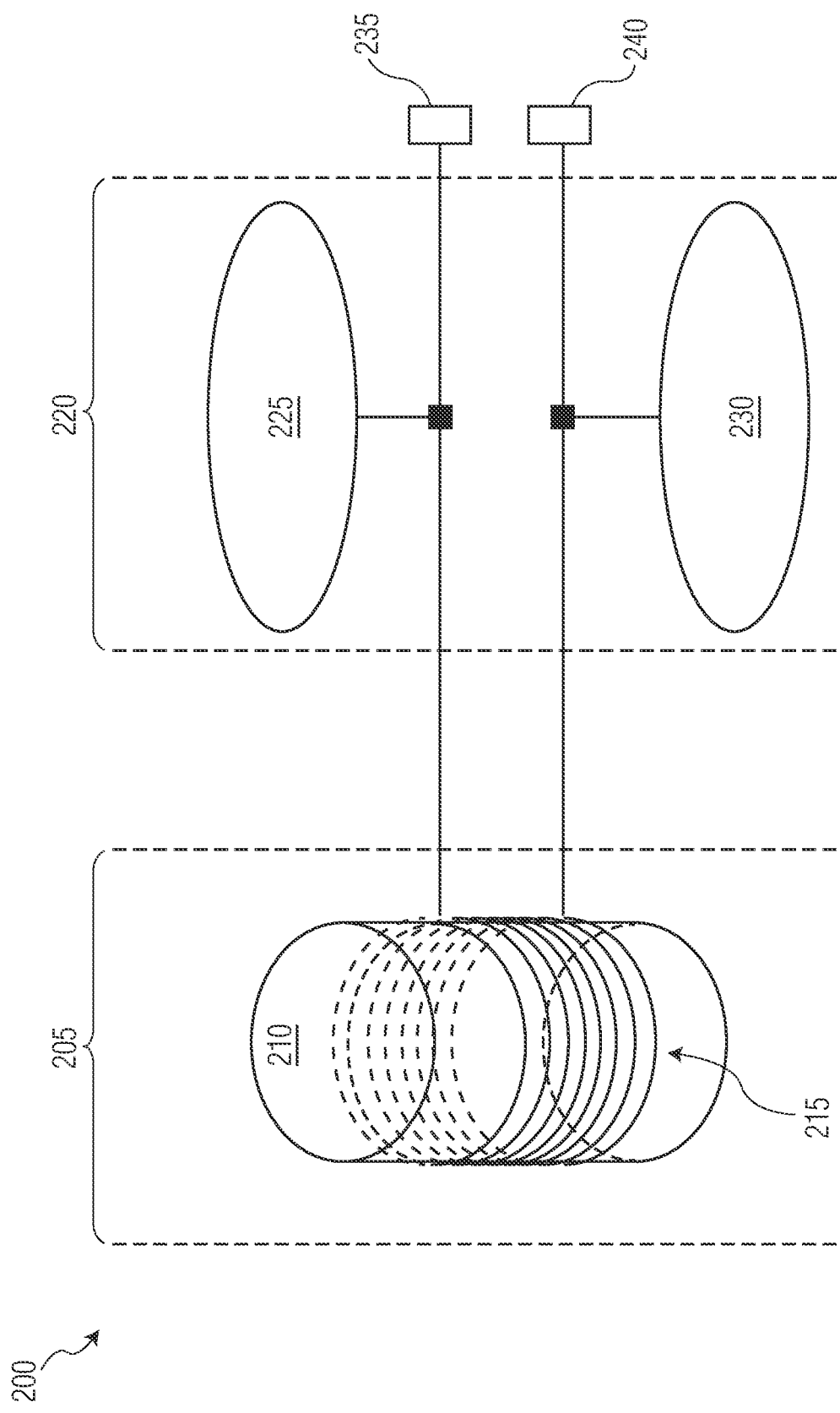
FIG. 2 is an example single coil near-field electromagnetic induction (NFEMI) antenna.

FIG. 2 is an example single coil near-field electromagnetic induction (NFEMI) antenna 200. The antenna 200 in this example is an electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading structures 225 and 230. Antenna 200 feed points 235, 240 are coupled to various transceiver circuitry, such as downstream radio transmitter and receiver integrated circuit (RF-IC), (not shown here).

When the NFEMI antenna 200 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 200 operates at or below 50 MHz (e.g. for example at 30 MHz) to ensure that the fields are following the structure's contours and to ensure that far field radiation is strongly reduced.

Figure 3:
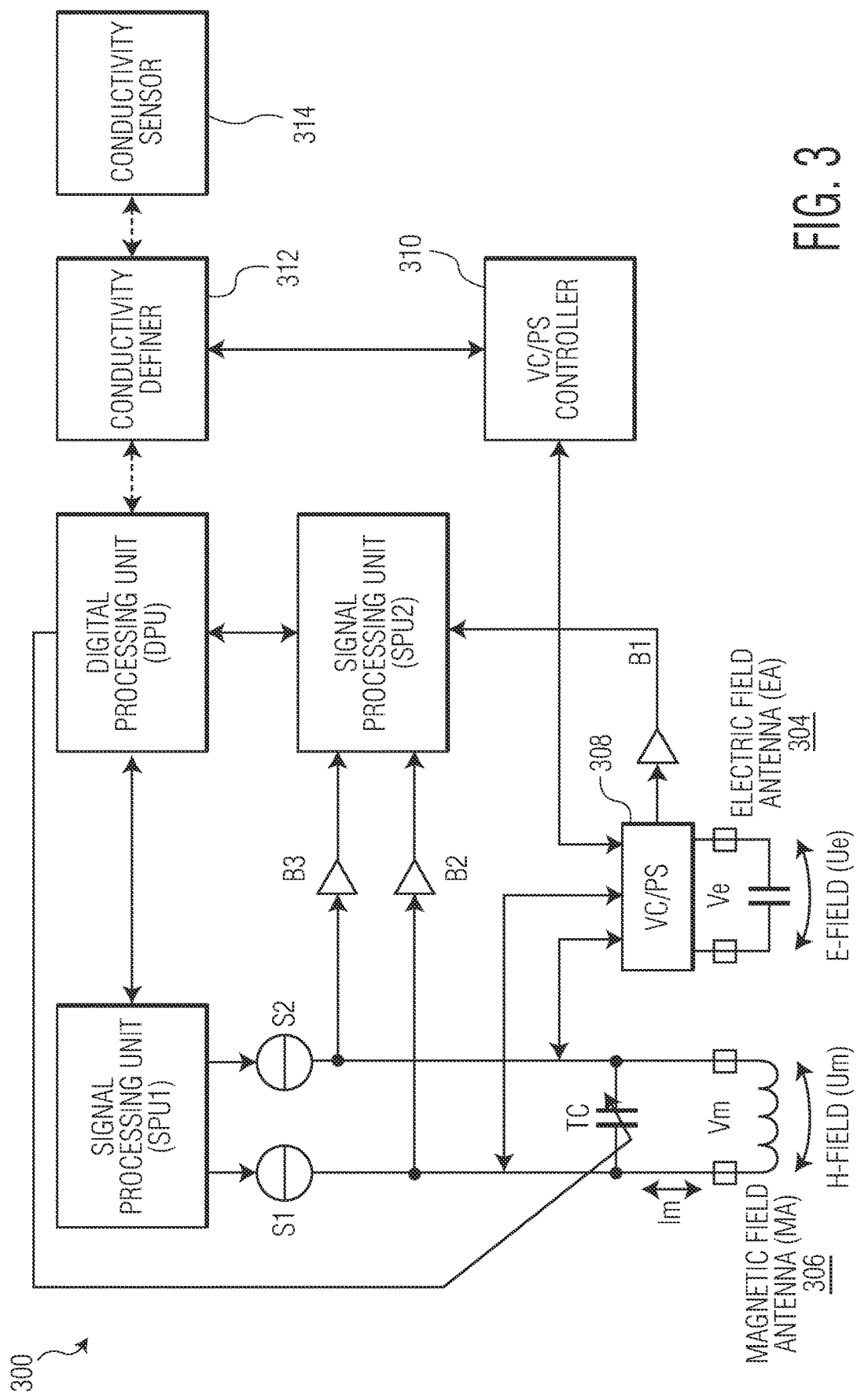
FIG. 3 is another example near-field wireless device.

FIG. 3 is another example near-field wireless device 300 configured to modulate a E/H ratio of fields sent to and/or received from an included near-field electric (E) antenna 304 and near-field magnetic (H) antenna 306 in response to a conductivity of a medium surrounding the device 300. The device 300 also includes signal processing units (SPU1) and (SPU2), a digital processing unit (DPU), signal generators S1 and S2, buffers B1, B2, B3, a tuning capacitor (TC), a voltage control/phase shift unit (VC/PS) 308, a VC/PS controller 310, a conductivity definer 312, a conductivity sensor 314, and related circuits.

The device 300 operates on the following two principles. The first principle is that a near-field magnetic (H) antenna signal, is not as attenuated by the conductivity of the medium surrounding the device 300 as a near-field electric (E) antenna signal is, but has a relatively shorter communications range. The second principle is that the near-field electric (E) antenna signal, has a greater range in terms of on-body communication than the near-field magnetic antenna signal, but is more attenuated by the conductivity of the medium surrounding the device 300 than the H-field signal is.

The DPU controls the operation of the device 300 and processes the signals related to the near-field communication. Signal processing units SPU1 and SPU2 contain hardware to interface to the antennas MA, EA and the DPU. SPU1 and SPU2 are connected to additional baseband circuitry (not shown) that either generates or receives the data in the near-field signals. SPU1 generates near-field transmit signals and SPU2 receives near-field signals.

Signal processing unit SPU1 commands signal generators S1 and S2 to produce currents that drive the electric antenna (EA) 304 and the magnetic antenna (MA) 306 through the tuning capacitor (TC) and the VC/PS 308.

TC in some example embodiments is an integrated capacitor bank in an RF integrated circuit that can be adjusted by the digital processing unit DPU. The resonating frequency can be chosen in one of the ISM bands, like 10.6 MHz. The resonating circuit has a bandwidth that is sufficient for the required communication mode data rate. Optionally the bandwidth can be adapted by means of inserting additional loss in the resonating circuit. This can be an additional functional block in the radio IC. The voltage Um on the magnetic antenna MA is processed in the voltage processing unit VC/PS and further applied to the electric antenna EA.

In transmit mode, the H-field (Um) is generated by a first alternating current (Im) through (i.e. first alternating voltage (Vm) across) the magnetic antenna MA, while the E-field (Ue) is generated by a second alternating voltage (Ve) on the electric antenna EA. The two voltages Vm and Ve thus define the H-field (Um) and E-field (Ue) respectively. Changing one of the amplitudes of Vm and Ve or a phase between them, changes the E/H ratio of signal strengths between the H-field and the E-field.

The E/H ratio of signal strengths between the H-field and the E-field can in some example embodiments is controlled by the voltage control/phase shift unit (VC/PS) 308. The VC/PS 308 under command of the VC/PS controller 310 modulates, in either transmit or receive modes, the voltage Vm on the magnetic antenna MA 306 and voltage Ve on the electric antenna EA 304. The VC/PS 308 may reduce or increase either an amplitude or phase of voltage Ve relative to Vm. In this way the E/H ratio between the H-field and the E-field may be changed depending upon the conductivity of the medium surrounding the device 300 and an aggregated conductivity of a medium surrounding both the device 300 and any other near-field wireless devices with which the device 300 is communicating.

The E/H ratio may be calculated in various ways such as: electric field (E-field) energy divided by magnetic field (H-field) energy, electric field (E-field) amplitude divided by magnetic field (H-field) amplitude, and/or electric field (E-field) phase subtracted by magnetic field (H-field) phase (e.g. phase ratio=$e^{i(ph_E - ph_H)}$).

The conductivity definer 312 can determine the conductivity of the medium in at least one of two ways, that in some example embodiments are combined.

In a first way, the conductivity definer 312 is coupled to receive information on the tuning bank components (e.g. tuning circuit 104 from FIG. 1) from the DPU. Based on changes in the capacitive (C-bank) and resistive (R-bank) tuning values, which occur as the DPU adjusts these values to maintain a resonance frequency and/or bandwidth of the wireless device 300 as the medium surrounding the device 300 changes in conductivity, the conductivity definer 312 can distinguish between mediums such as air and water.

The conductivity definer 312 then commands the VC/PS controller 310 to reduce or increase the input voltages Um and/or Ue. In this way the E/H ratio between the magnetic (H) and electric (E) fields can be changed according to the conductivity of the medium.

For example, as the conductivity of the medium increases, the DPU reduces the C-bank value to maintain the resonance frequency of the device 300. The conductivity definer 312 responds by decreasing the E/H ratio since the magnetic (H) near-field signals would be less impacted by the increase in conductivity than the electric (E) near-field signals.

Conversely, as the conductivity of the medium decreases, the DPU increases the C-bank value to maintain the resonance frequency of the device 300. The conductivity definer 312 responds by increasing the E/H ratio since the electric (E) near-field signals are less attenuated when the conductivity of the medium is lower.

In a second way, the conductivity definer 312 is coupled to the conductivity sensor 314. The conductivity sensor 314 may be a current measurement unit coupled to an analog to digital converter and configured to have direct galvanic or capacitive contact with the medium. Based on this current measurement the conductivity can be determined. For example, higher conductivity values will result in a higher measured current. In some example embodiments the current is measured using two electrodes submerged in the medium thereby forming a capacitor whose capacitance will change depending on the conductivity of the medium.

In some example embodiments, conductivity readings from a plurality of conductivity sensors 314 from a plurality of near-field wireless devices in communication are combined to aggregate the conductivity readings between any two of the near-field wireless devices such that an optimal E/H ratio can be set based on the aggregate conductivity.

Some example simulated use cases for these near-field wireless device are now discussed.

Figure 4A:
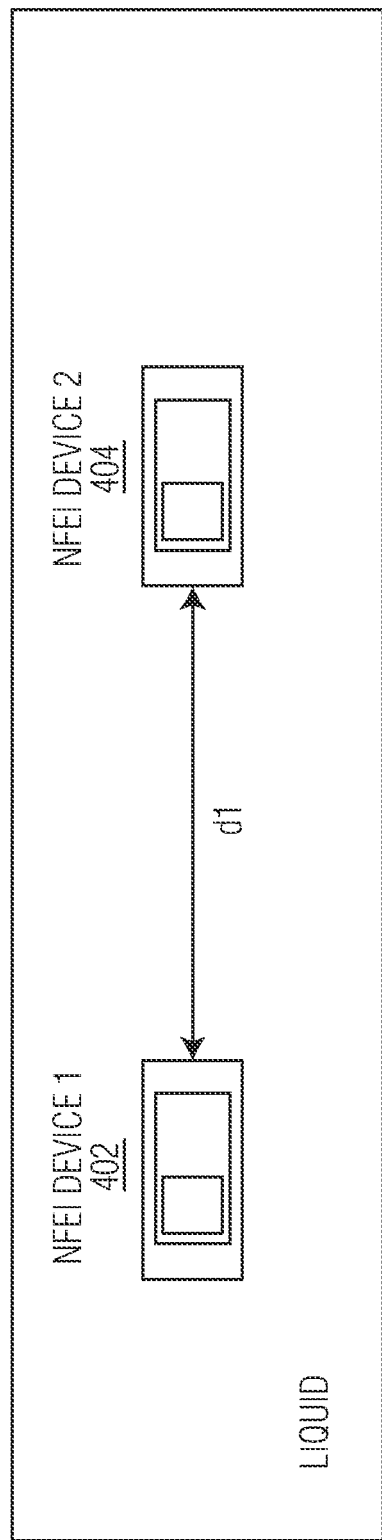
FIG. 4A is an example top pictorial view of two near-field electric-induction (NFEI) devices without a presence of a human body.
Figure 4C:
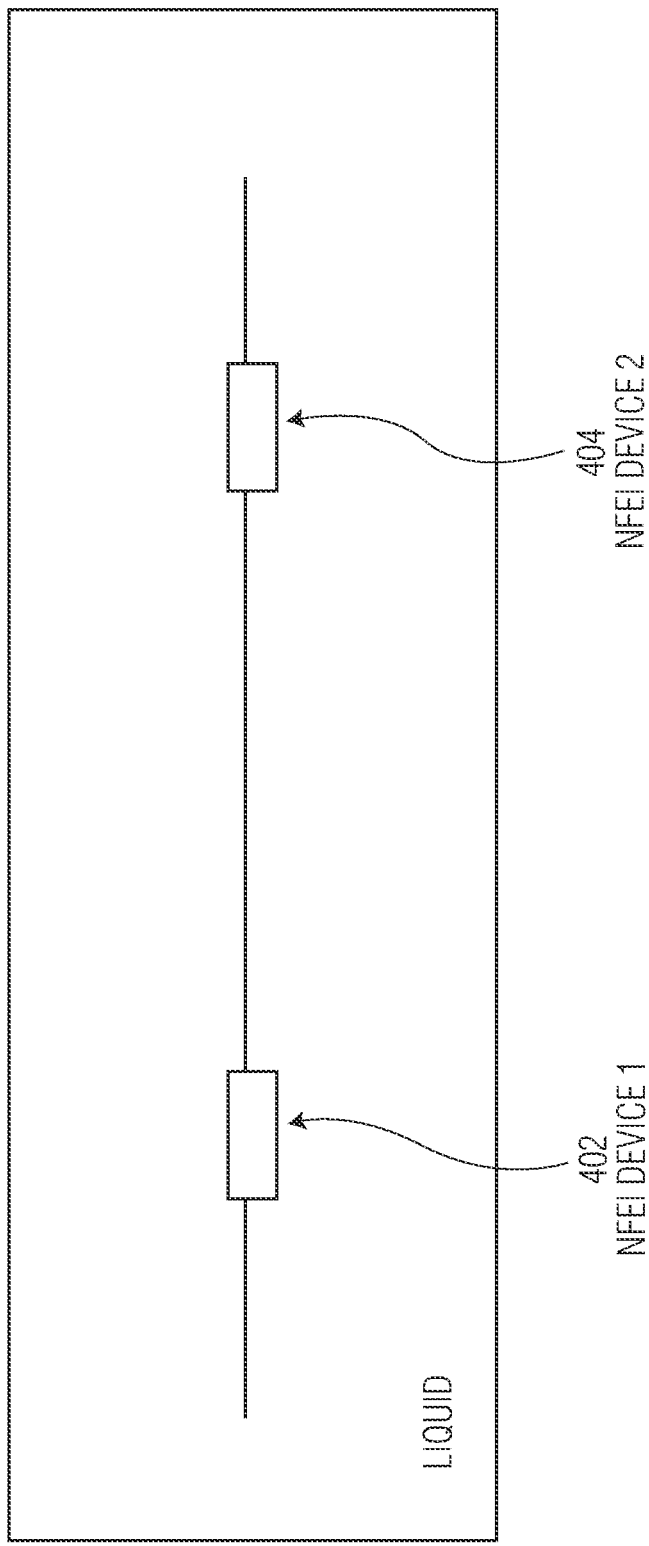
FIG. 4C is an example side pictorial view of the two near-field devices.

FIG. 4A is an example top pictorial view of two near-field electric-induction (NFEI) devices 402, 404 (E-field only) at distance d1 (30 cm) without a presence of a human body. FIG. 4B is an example top pictorial view of two near-field electric-induction (NFEI) devices 402, 404 (E-field only) with the presence of the human body. FIG. 4C is an example side pictorial view of the two near-field devices 402, 404.

The E-field antenna of the NFEI devices 402, 404 for the purposes of this simulation are deemed to be enclosed by plastics at a spacing of 1 mm. Both antennas are composed of two parallel conductive plates that are placed in a box to simulate different media (air, pure water, sea water). The antennas are driven by a 50 Ohm source.

The simulations to follow show the E-field in various mediums (e.g. air, pure water, sea water) both with and without a presence of an intervening conductive structure (e.g. a human body). The liquid in these simulations is a deionized pure water which has a conductivity of 5.5 μS/m at 25° C. for the simulations. To compare, air has a conductivity of $10\text{--}15$ to $10\text{--}9$ S/m. In what follows simulations will be described of the first mode where the conductivity of the fluid is low with respect to the reasonably well conducting (inner) body. Liquids like sea water have a conductivity of approximately 1.6 S/m. To compare air has a conductivity of $10^{-15}$ to $10^{-9}$ S/m.

Figure 5A:
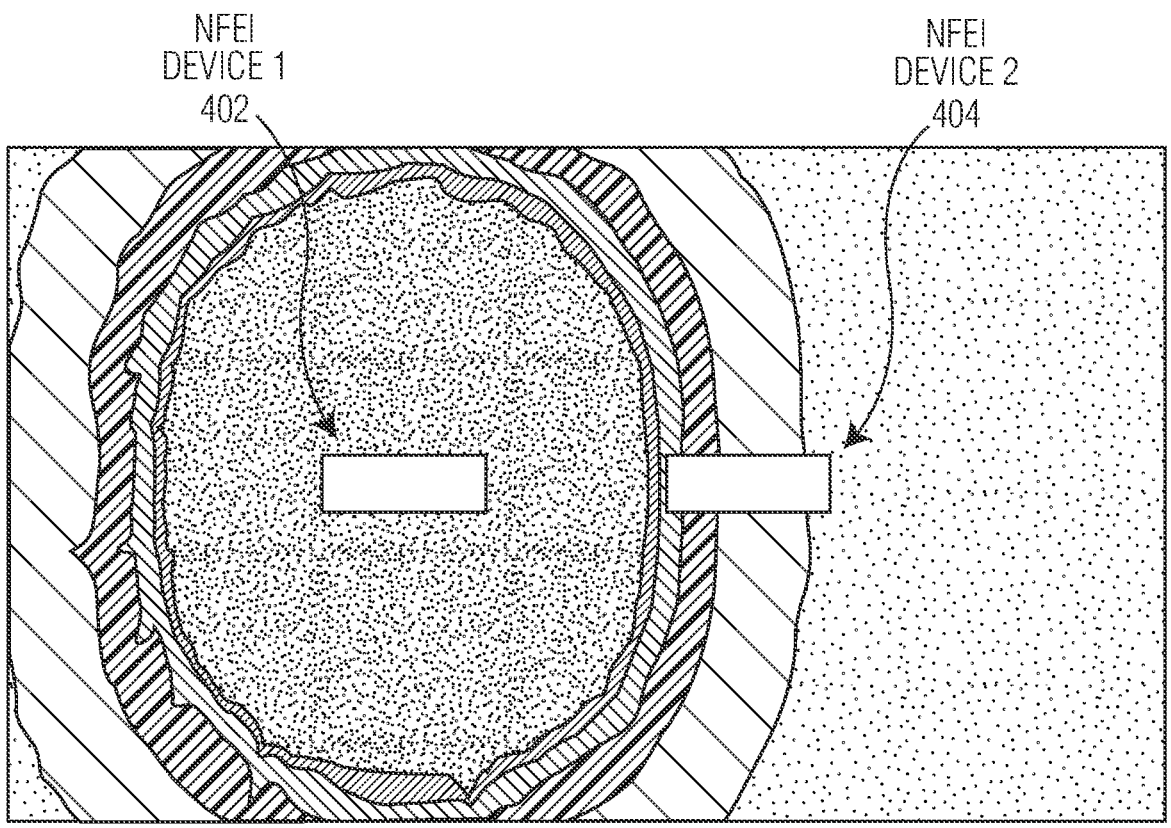
FIG. 5A is an example side pictorial in air—not on-body view of the two near-field devices.
Figure 5B:
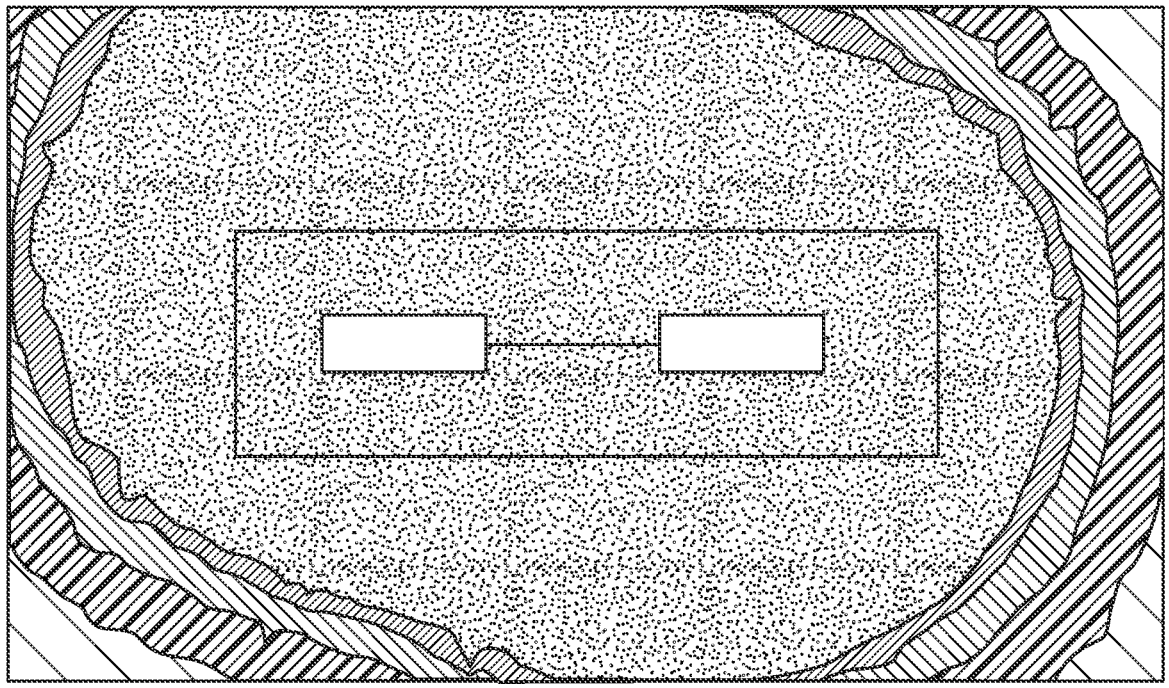
FIG. 5B is an example side pictorial in air—on-body view of the two near-field devices.
Figure 5C:
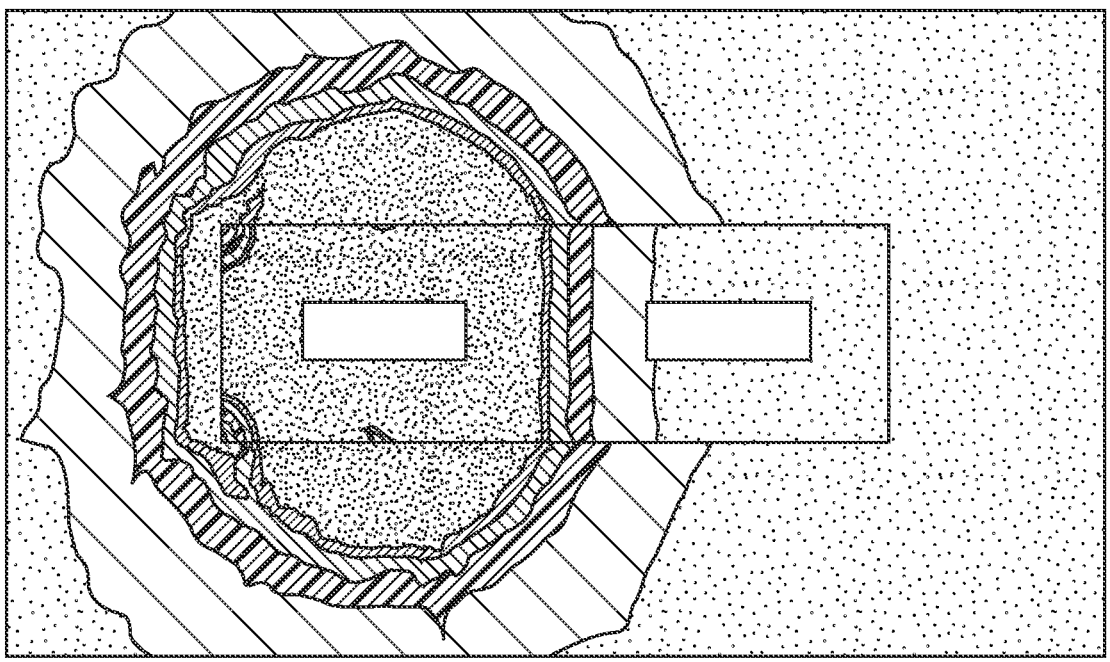
FIG. 5C is an example side pictorial in pure water—not on-body view of the two near-field devices.
Figure 5D:
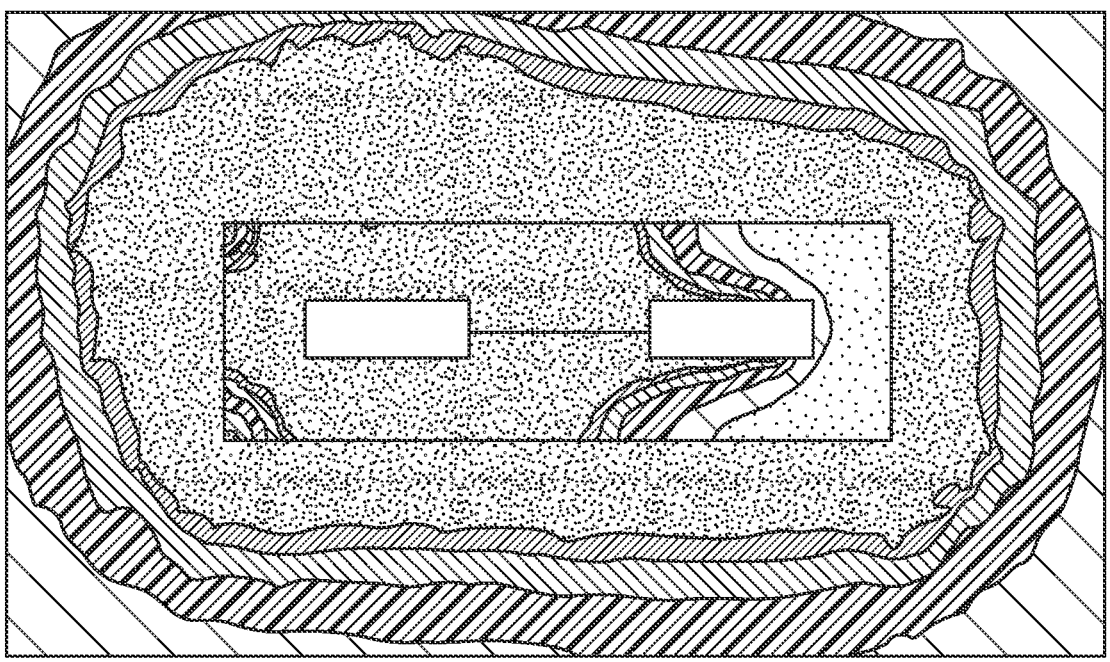
FIG. 5D is an example side pictorial in pure water—on-body view of the two near-field devices.
Figure 5E:
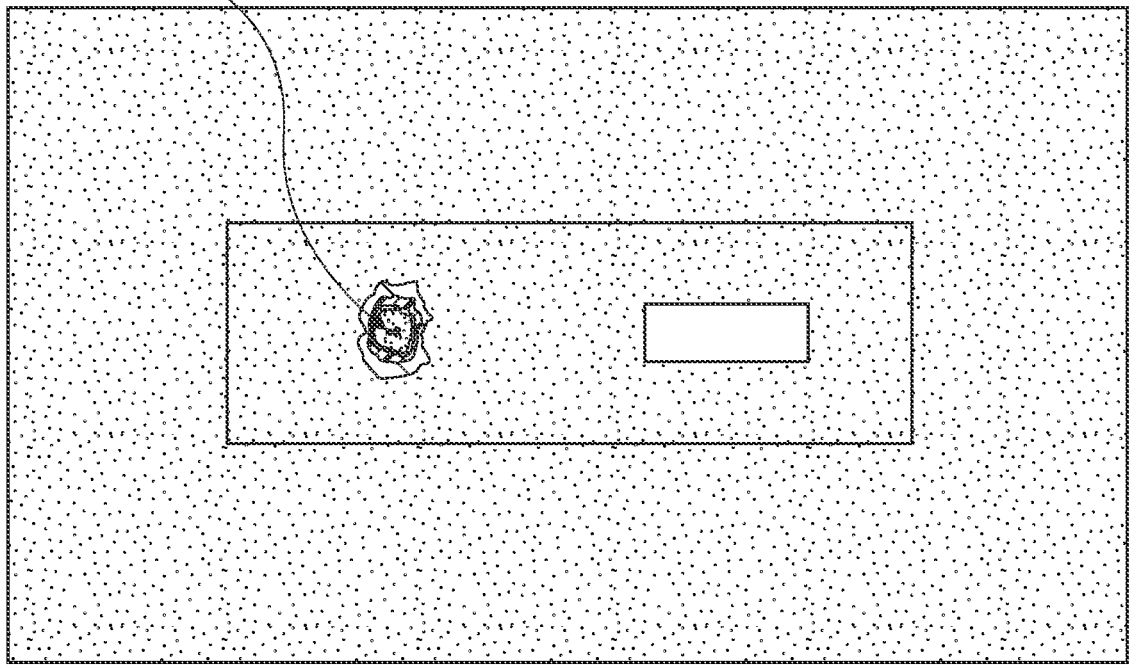
FIG. 5E is an example side pictorial in sea water—not on-body view of the two near-field devices.
Figure 5F:
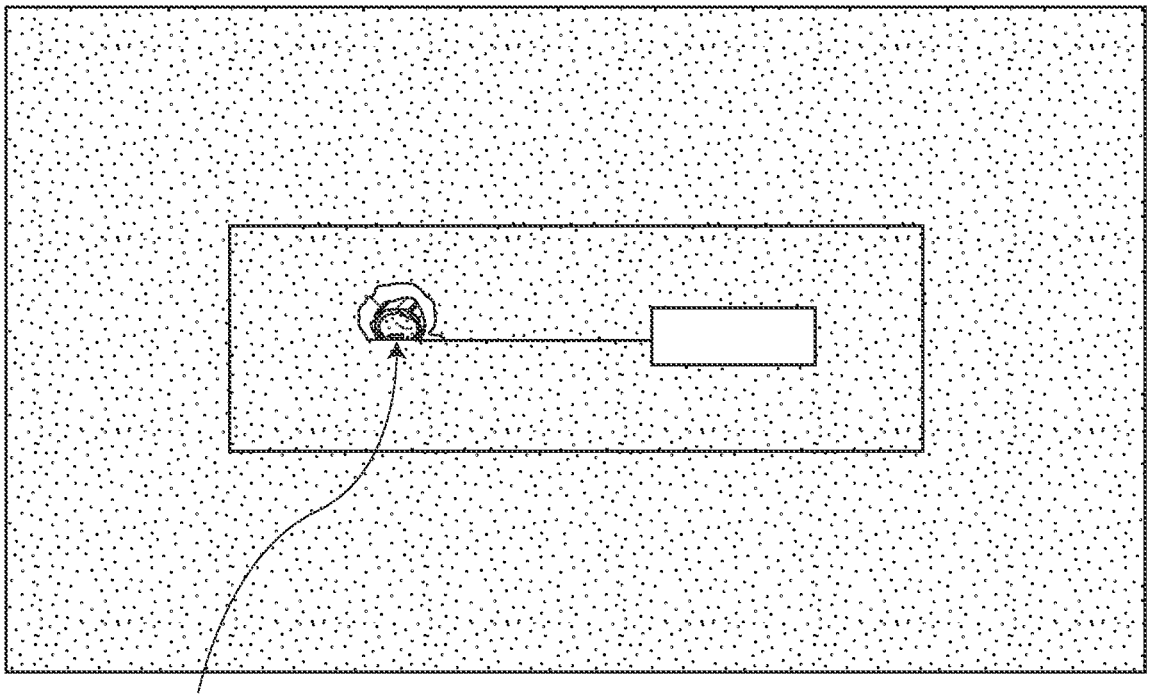
FIG. 5F is an example side pictorial in sea water—on-body view of the two near-field devices.

FIG. 5A is an example side pictorial in air—not on-body view of the two near-field devices 402, 404 including a magnitude of the E-field, |E| in a plane perpendicular to the antenna plates surfaces. FIG. 5B is an example side pictorial in air—on-body view of the two near-field devices 402, 404 including a magnitude of the E-field, |E| in a plane perpendicular to the antenna plates surfaces. FIG. 5C is an example side pictorial in pure water—not on-body view of the two near-field devices 402, 404 including a magnitude of the E-field, |E| in a plane perpendicular to the antenna plates surfaces. FIG. 5D is an example side pictorial in pure water—on-body view of the two near-field devices 402, 404 including a magnitude of the E-field, |E| in a plane perpendicular to the antenna plates surfaces. FIG. 5E is an example side pictorial in sea water—not on-body view of the two near-field devices 402, 404 including a magnitude of the E-field, |E| in a plane perpendicular to the antenna plates surfaces. FIG. 5F is an example side pictorial in sea water—on-body view of the two near-field devices 402, 404 including a magnitude of the E-field, |E| in a plane perpendicular to the antenna plates surfaces. For clarity, 402 and 404 are not explicitly labelled in each Figure, but still correspond to the boxes indicated in FIG. 5A for example.

Simulation results using a 3D EM (Electromagnetic) solver are then used in the receiver circuit with tuning components (for example L=3.7 uH) to result in a received voltage at F=10.6 MHz for a bandwidth of 450 KHz and a transmitted voltage of 132 dBuV of the application. The received signal strength (RSS) is then found to decrease when the setup is moved from air to be submersed in pure water.

When the conductivity of the fluid is high, the E-field will not exist significantly in the highly conducting medium. Any voltage that is provided onto the conductive plates of the near-field electric (E) antenna can only generate an E-field between the plates and in close proximity of the plates given that there is no fluid present like when there is a housing surrounding the antenna, electronics, circuit boards, etc. with air as internals to a product.

Outside of the near-field device's housing the medium is then highly conducting and here the electric field will not exist significantly, and the received signal strength (RSS) decreases with 29 dB when the setup is moved from air to be submersed in sea water.

Simulation of the E-field when the devices 402, 404 are operating in the presence of a human body are also shown. Simulation results from the 3D EM solver are then used again in the receiver circuit of our application with tuning components (for example L=3.7 uH) to result in a received voltage at F=10.6 MHz for a bandwidth of 450 KHz and a transmitted voltage of 132 dBuV of the application.

These simulations show that a received signal strength (RSS) decreases by 20 dB when an on-body setup is submersed in pure water. The human body confines the E-field that was transmitted by the 1$^{st}$ device 402 such that E-field is received at the 2$^{nd}$ on-body device 404. The received signal strength (RSS) can be degraded with 20 dB when the on-body setup is submersed in pure water and this is a margin that can be taken into account in the design when targeting applications in fluids.

The simulation also shows that the received signal strength (RSS) decreased with 54 dB when the on-body setup is moved from air to be submersed in sea water. When the conductivity of the fluid is high, the E-field will not exist significantly in the highly conducting medium irrespective of a human body being present.

Figure 6A:
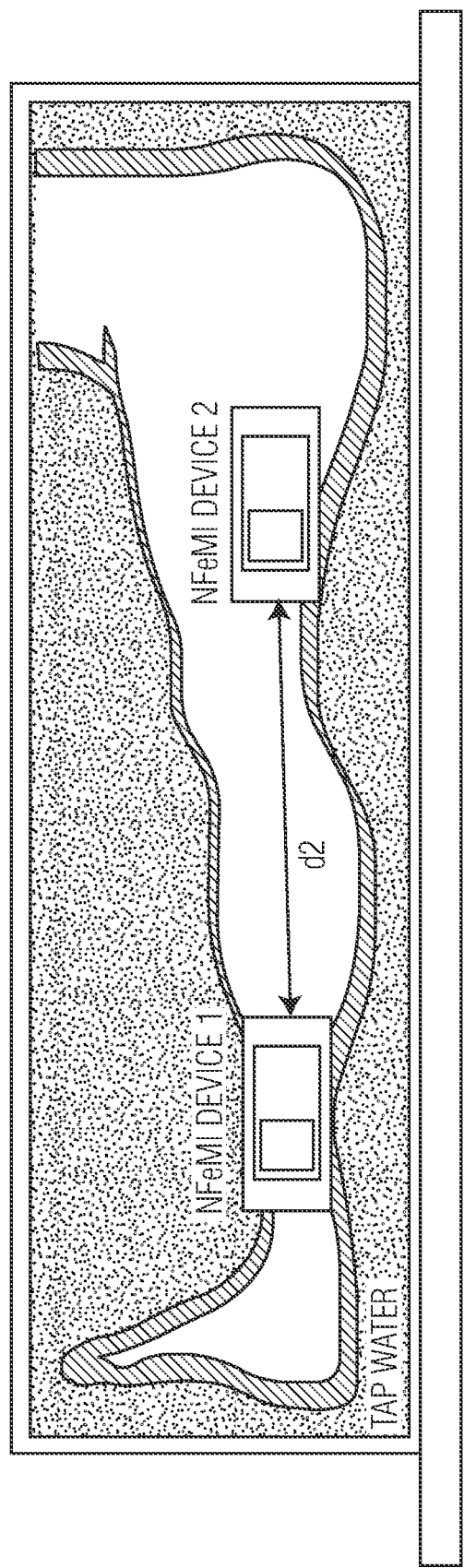
FIG. 6A is an example pictorial side view of two NFeMI devices attached to a human body and submersed in water.

FIG. 6A is an example pictorial side view of two NFeMI devices at a distance d2 attached to the human body and submersed in water. In these measurements where the conductivity of the fluid is low with respect to the reasonably well conducting (inner) body. Tap water having a conductivity of 0.0005 to 0.055/m is used for this testing. The near-field devices used are near-field electromagnetic induction (NFeMI) devices having both a magnetic H-field antenna and an electric E-field antenna.

Figure 6B:
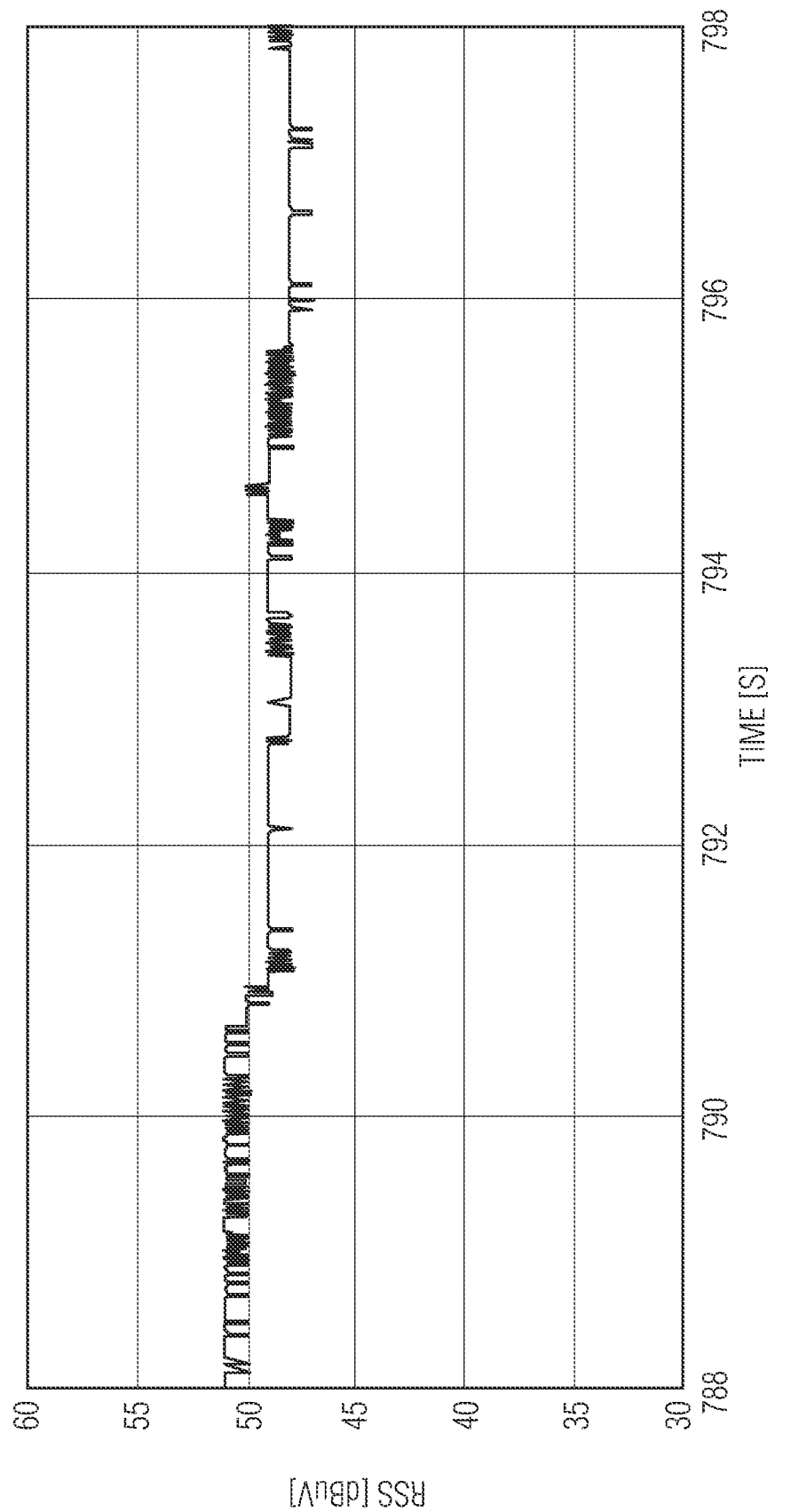
FIG. 6B is an example measured received signal strength (RSS) link in the presence of the human body.

FIG. 6B is an example measured received signal strength (RSS) link in the presence of the human body (i.e. the two NFeMI devices are attached to the skin of a user). When the water layer is only a few centimetres, simulations of the magnitude of the E-field have shown that the values of |E| in the air above the water layer can be significantly higher and are likely to be a main contributor to the received voltage measured. The received signal strength (RSS) is initially 50 dBuV before the devices are submersed in the water and drops to 48 dBuV approximately after the devices are submersed in the water.

The RSS (i.e. 50 dBuV) is higher when the two devices are on a human body thanks to the E-field that is confined to the body due to the large conductivity difference between air and living tissue as compared to the RSS when two devices are not in the presence of a human body.

When the on-body NFeMI link is submersed in a few cm of tap water it is found that the link is not severely deteriorated although the conductivity of water is higher than that of air. As mentioned above, in the air layer that is present a few cm above the water layer simulations have shown that the magnitude of the E-field |E| can be significantly higher than in the water layer and is likely to be a main contributor to the received voltage measured.

FIG. 7 is table showing an example set of capacitances (C) for a near-field electric (E) antenna and corresponding tuning capacitance (C-bank) values dependent upon the medium in which the near-field devices are in. The capacitance of the near-field electric (E) antenna in this example is surrounded by 1 mm plastic spacing is increased by the conductive medium. As shown, a capacitance (C) seen by a radio IC baseband circuit will increase from 2 pF to 9 pF when the near-field electric (E) antenna is in sea water.

Figure 8:
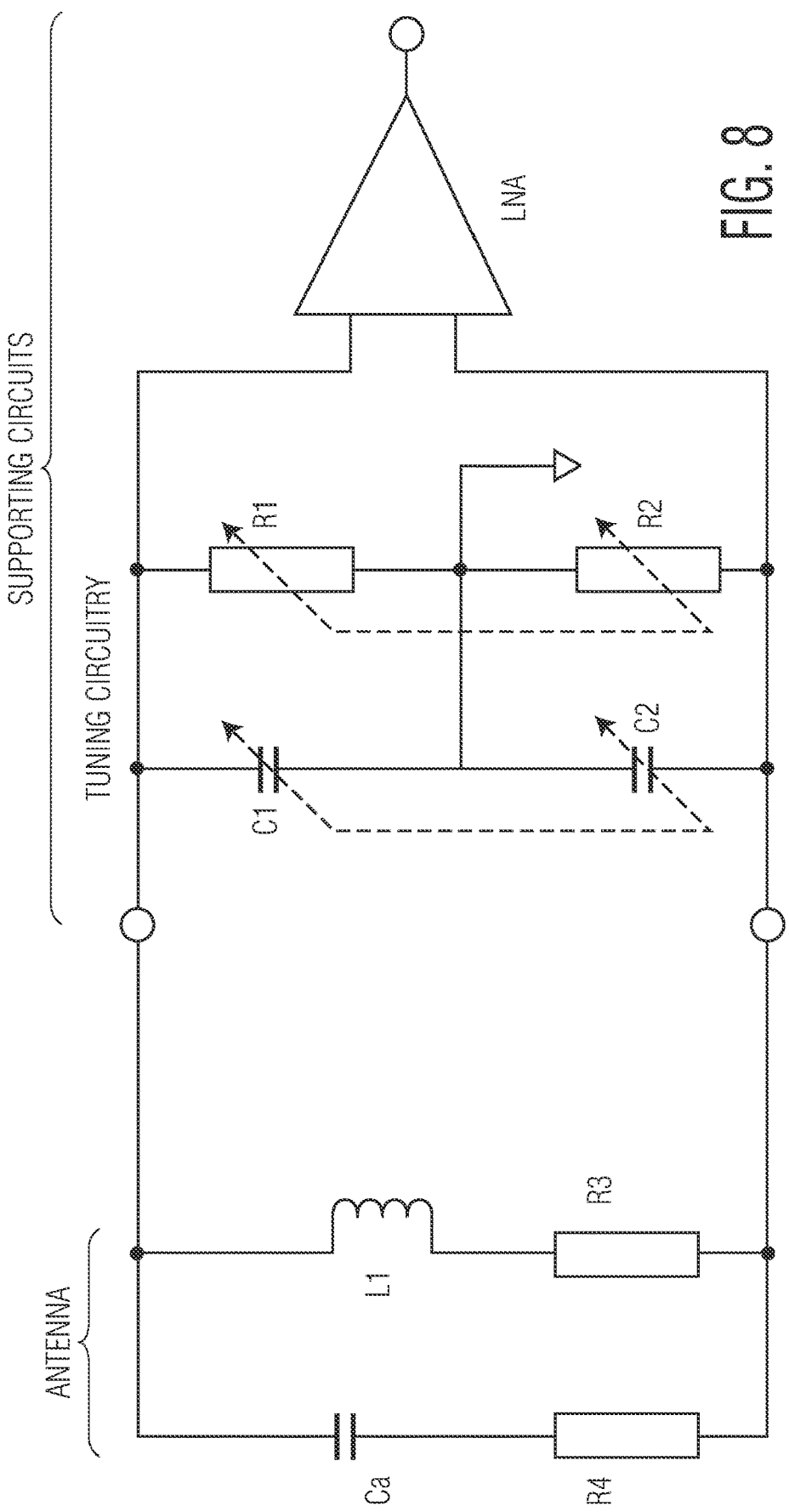
FIG. 8 is an example near-field device including the near-field antenna and supporting circuits configured to receive near-field signals.

FIG. 8 is an example near-field device including the near-field antenna and supporting circuits configured to receive near-field signals. The antenna includes the magnetic (H-field) antenna having a loss resistance (R3) and an inductance (L1), the electric (E-field) antenna having a conductive structure formed from the two loading plates, and the two feeding points, having a loss resistance (R4). The supporting circuits include a tuning circuit, an LNA (low noise amplifier) and control lines connecting to the tuning circuitry.

Both antennas are together resonance tuned by the controller at the communication frequency, for example 10.6 MHz, with the variable capacitors C1 and C2. Variable loading resistors R1 and R2 are tuned for the required communication bandwidth, for example 400 KHz.

In receive mode, the electric and magnetic fields induce voltages in the antenna elements. The electric field induces a voltage Vca in the antenna capacitor. The voltage seen at the RF ports of the radio IC is the induced voltage in the antenna capacitor partially multiplied with the quality factor of the antenna system circuit. The resonant current is shared between the antenna capacitance and the tuning capacitance of the radio IC.

$$V_{Rx,Ca} = V_{ca} Q C_a / (C_a + C_{tune,IC})$$

By applying the NFeMI device in a conductive medium, Ca will increase as shown in the table and less Ctune, IC is required. This means that a larger part of the resonance current will pass through Ca and a higher voltage is received compared with an application in air. In received signal strength this is translated to an increase of 12-14 dB by submerging in sea water.

In another near-field antenna, the single coil L1 can also be replaced by a coupled coil which serves as an impedance downconverter (autotransformer). At the RF ports of the radio IC the antenna capacitance shows up as a larger capacitance due to the voltage gain provided by using coupled coils. When such NFeMI device is simulated in water the capacitance seen by the IC will be increasing from 5 to 20.5 pF instead of from 2 pF to 9 pF.

Improvement to the transmission in conductive media is be made by designing an antenna system with a smart capacitive tuning system where the antenna capacitance can be larger (2 pF-10 pF) and the capacitive tuning bank can provide minimal Ctune,IC to improve the multiplication factor of the induced voltage Vca to the received input voltage at the LNA.

Applications of the near-field devices just discussed include: wearables for wireless on-body networks that require a small form factor and need to operate when submersed in a fluid like water; and monitoring body parameters of professional divers operating in the civil sector (construction pits, tunnels), the military sector (clearing of mines), the service sector (search and rescue operation) and others.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field wireless device, comprising:
   a controller configured to be coupled to a near-field antenna;
   wherein the near-field antenna includes,
      a near-field electric antenna configured to transmit and/or receive near-field electric (E) signals; and
      a near-field magnetic antenna configured to transmit and/or receive near-field magnetic (H) signals;
   a conductivity monitor configured to determine a conductivity of a medium proximate to the near-field device;
   wherein the controller is configured to modulate an E/H ratio of fields generated by and/or received from the near-field electric (E) antenna and the near-field magnetic (H) antenna based on the conductivity of the medium.

2. The device of claim 1:
   wherein if the conductivity is beneath a threshold value, the controller is configured to maintain or increase the E/H ratio.

3. The device of claim 2:
   wherein if the conductivity is above the threshold value, the controller is configured to reduce the E/H ratio.

4. The device of claim 1:
   wherein the E/H ratio is calculated as: electric field (E-field) energy divided by magnetic field (H-field) energy.

5. The device of claim 1:
wherein the E/H ratio is calculated as: electric field (E-field) amplitude divided by magnetic field (H-field) amplitude.
6. The device of claim 1:
wherein the E/H ratio is calculated as: electric field (E-field) phase subtracted by magnetic field (H-field) phase.
7. The device of claim 1:
further comprising a set of tuning values configured to set a resonance frequency and/or bandwidth of the near-field wireless device;
wherein the conductivity monitor is configured to determine the conductivity of the medium based on the set of tuning values; and
wherein the controller is configured to modulate the E/H ratio based on the set of tuning values.
8. The device of claim 7:
wherein the set of tuning values include a capacitance; and
wherein if the conductivity of the medium increases, the controller is configured to decrease the capacitance.
9. The device of claim 7:
wherein the set of tuning values include a capacitance; and
wherein if the conductivity of the medium decreases, the controller is configured to increase the capacitance.
10. The device of claim 1:
wherein the conductivity monitor is configured to determine the conductivity from a set of electrodes galvanically coupled to the medium.
11. The device of claim 1:
wherein the conductivity monitor is configured to determine the conductivity from a data communication received from a remote conductivity sensor.
12. The device of claim 1:
wherein the conductivity monitor is configured to determine the conductivity from a set of pre-programmed medium conductivities.
13. The device of claim 12:
wherein such pre-programmed medium conductivities are based on a medical and/or exercise protocol.
14. The device of claim 1:
wherein the conductivity monitor is configured determine the conductivity from an aggregate set of conductivity readings from a plurality of conductivity sensors.
15. The device of claim 1:
wherein the near-field device is a first near-field device configured to transmit and/or receive the near-field signals with a second near-field device and a third near-field device;
wherein an aggregate conductivity of an aggregate medium surrounding the first and second near-field devices is different from an aggregate conductivity of an aggregate medium surrounding the first and third near-field devices;
wherein the controller is configured to adjust the E/H ratio to a first E/H ratio when transmitting and/or receiving the near-field signals with the second near-field device; and
wherein the controller is configured to adjust the E/H ratio to a second E/H ratio when transmitting and/or receiving the near-field signals with the third near-field device.
16. The device of claim 1:
wherein the near-field device is configured to transmit and/or receive the near-field signals with a second near-field device; and
wherein the controller is configured to further adjust the E/H ratio in response to a distance of the near-field device from the second near-field device.
17. The device of claim 1:
wherein the medium is a liquid.
18. The device of claim 1:
wherein the medium is external to the near-field device.
19. The device of claim 1:
wherein the medium surrounds the near-field device.
20. The device of claim 1:
wherein the device is embedded in at least one of: a smart phone, a smart watch, a sensor, a medical sensor, an earbud, or an audio device.

* * * * *